Patented Apr. 18, 1939

2,154,930

UNITED STATES PATENT OFFICE 2,154,930

PROCESS FOR THE PURIFICATION OF POLYHYDRIC ALCOHOLS

Theodore Evans, Berkeley, Calif., assignor to Shell Development Company, San Francisco, Calif., a corporation of Delaware No Drawing. Application December 27, 1937, Serial No. 181,995

8 Claims. (Cl. 202—56)

The present invention relates to a process for the removal of certain undesirable constituents from polyhydric alcohols, and more particularly, to the removal of coloring bodies from glycerol.

Recent developments, such as the advent of Cellophane, synthetic resins, etc., have greatly increased the consumption and dictated new and exacting specifications for polyhydric alcohols, especially glycerol, and as a consequence, considerable attention has been given to the problem of producing these products in a pure state from new sources.

One promising solution to the problem is in the preparation of glycerol from petroleum hydrocarbons. Not only is it possible to produce glycerol from this source at a reasonable cost, but with proper care a glycerol of higher purity may be made. In this process, the crude glycerol liquor containing water, salt and glycerol is boiled down to remove the water, whereby the bulk of the salt crystallizes out and is removed. The crude glycerol containing about 80% glycerol, 8% salt and 12% water may be distilled in vacuo to yield a glycerol of high purity.

The use to which the glycerol is to be applied, however, dictates the requirements as to the purity. For example, glycerol used as a plasticizing agent in Cellophane must meet very stringent specifications and is sometimes designated as very pure glycerol. In actuality, however, the glycerol used for this purpose is exceptionally free from ash-forming, coloring and odoring impurities, but often contains a considerable amount of impurities, such as trimethylene glycol, methyl glycerol, etc., which, for the purpose at hand, exert no or little detrimental effect.

On the other hand, in the manufacture of certain synthetic resins, while the requirements regarding color and odor are quite lenient, the presence of trimethylene glycol, methyl glycerol, etc., is to be avoided as far as possible.

The glycerol obtainable through proper synthesis from petroleum hydrocarbons is exceptionally free from these latter type impurities. This glycerol, however, in spite of its analytical purity, contains a trace of coloring matter, which, although far too small to be detected analytically, renders the material unfit for certain exacting uses.

An object of the present invention is to provide a method whereby these coloring bodies, whenever present, may be removed from polyhydric alcohols. A further object of the invention is to provide a method whereby glycerol of exceptional limpidity may be produced. A further object of the invention is to provide a method which is economical, which is commercial, and which can be carried into practice on an industrial scale.

These objects, I have found, may be accomplished by a suitable extraction process. According to the preferred embodiment of my invention, I extract the once fractionated glycerol with a suitable immiscible solvent at an elevated temperature. After mechanically separating the extract and raffinate phases, I subject the raffinate to a second fractionation in vacuo and recover a good yield of substantially colorless glycerol.

As is known, the crude glycerol, obtained by the concentration of the glycerol liquor, contains considerable coloring matter, varying in color from a straw yellow to almost black, depending upon the source of the glycerol liquor. This coloring matter consists predominantly of non-volatile tarry material which may be completely removed by an efficient fractionation.

I have found, however, that there also exists a smaller proportion of color-forming bodies of an entirely different nature, and it is with the removal of these latter bodies that the present invention is primarily concerned. Upon efficient fractionation of the glycerol liquor, these color-forming bodies, unlike the beforementioned bodies, are found to distill with the glycerol. Although these bodies may be concentrated to a certain extent into the first and last fractions of distillate, they cannot be even partly removed by fractionation methods without incurring great losses of glycerol.

I have found that these volatile color-forming bodies are not extracted from the crude glycerol to any appreciable extent by lipophilic solvents. They are, therefore, predominantly hydrophilic in character. However, I have found that these bodies, upon being subjected to a suitable heat treatment, become lipophilic in character and hence extractable by any of the common lipophilic solvents. The prolonged heating necessitated by a distillation under diminished pressure suffices, in general, to effect the conversion. Therefore, in accordance with the present invention, the color-forming bodies may be most conveniently extracted from the distilled glycerol. Any other equivalent heat treatment may, however, be used.

Contrary to expectation, I have found that the extraction step is ineffective if applied at ordinary temperatures. Samples of distilled glycerol, upon prolonged extraction with various solvents at ordinary temperatures, were not appreciably improved. On the other hand, I have found the extraction to be quite rapid and efficient at elevated temperatures. In general, I have found temperatures ranging from about 50° C. to about 150° C. and preferably from about 80° C. to about 150° C. to be quite satisfactory and convenient. Temperatures below 50° C. are not preferred, since at about this temperature the extraction efficiency falls off markedly. Temperatures higher than 150° C. are believed to be equally applicable, providing that the temperature is not sufficiently high to cause decomposition of the glycerol or the solvent.

The coloring bodies in the distilled glycerol, being of lipophilic character, may be extracted by any one of the numerous lipophilic solvents. A suitable solvent should, however, be stable at the temperatures employed, be immiscible in and inert to glycerol and must be easily and completely removable from the glycerol raffinate. I have found the hydrocarbons, ethers, organic esters and such chlorinated solvents as substantially fulfill the above-mentioned requirements to be efficient extractants. In order to simplify the removal of the last traces of extractant from the glycerol raffinate, it is advantageous to employ such solvents as have boiling points sufficiently lower than that of the polyhydric alcohol so as to permit convenient and complete separation by fractionation. For example, for the extraction of glycerol, solvents having normal boiling points appreciably below 290° C. and preferably below 200° C. are best suited. Examples of suitable solvents include di-isopropyl ether, hexane, glycol-dimethyl ether, heptane, iso-octane, n-octylene, diisobutylene, benzene, toluene, xylene, ethyl benzene, mesitylene, pseudo cumene, cumene, cymene, butyl acetate, cyclohexane and methyl cyclohexane.

Of the classes of available solvents I have found the hydrocarbon solvents to be particularly suitable. These solvents have in general the following desirable characteristics:
1. They are very efficient extractants.
2. They possess very little solubility for glycerol. For example, xylene at 95° C. dissolves 0.04 gm. glycerol per 100 cc.
3. They are readily obtained in sufficient purity and do not require any pretreatment such as the removal of alcohol from the commercial esters.
4. They do not form peroxides which may affect the quality of the glycerol as is the case especially with the lower boiling ethers.
5. They are in general quite stable and show no tendency to hydrolyze or react with the polyhydric alcohol.
6. They are relatively inexpensive and readily obtainable in commercial quantities.

Further, in order to avoid the necessity of carrying out the extraction step under pressure, I prefer to use solvents of the above classes having normal boiling points appreciably higher than the temperature prevailing during the extraction. It is to be understood, however, that lower boiling solvents employed under suitable pressure are also applicable.

Any traces of extractant remaining after the extraction of the coloring matter and separation of the phases may be removed by distillation, blowing with an inert gas, in vacuo, or any other of the conventional methods. Glycerol thus purified and freed from traces of extractant meets the usual specifications.

I have found, however, that by subjecting the extracted glycerol to a second vacuum distillation, a further improvement may be realized yielding a glycerol of exceptional limpidity.

Thus, after extraction there invariably remains a trace of coloring matter. Upon distilling the extracted glycerol in vacuo, it is found that this coloring matter is concentrated into the first fraction to distil. By collecting the more colored first fraction separately, and returning it to the next succeeding batch to be extracted, the main distillate is found to be practically color free, i. e., having a color of less than 10. (The color figures used throughout this specification refer to the conventional platinum-cobalt scale in which a color of 25 is designated as "water white".)

While in the preferred embodiment of my invention I subject substantially anhydrous glycerol to the extraction step, it is to be understood that the presence of water has no harmful effect on the process and is only avoided because of the high cost of its subsequent removal.

The process may be carried out either continuously, intermittently or batchwise. The solvent may be used in a single step, or in subdivisions, or countercurrent operation may be employed. A temperature gradient may be maintained, if desired.

The following examples are submitted solely to illustrate suitable executions of my invention and the effectiveness thereof, and are not to be construed as limiting the scope of the invention to the extractant, temperature, mode of execution, and the like.

Example I

A volume of crude glycerol obtained through synthesis from petroleum hydrocarbons and containing about 80% glycerol was fractionally distilled under (1–2) mm. Hg pressure, whereupon a distilled substantially pure anhydrous glycerol having a color greater than 50 was obtained. This glycerol was extracted at about 86° C. with a total of about 1.4 volumes of xylene. The glycerol raffinate was then subjected to a second fractional distillation under one mm. Hg pressure, and the first 10% to distil collected as a separate fraction. The color of the first 10% fraction was about 25, while the remaining 86.5% taken overhead had a color of 0–5. The glycerol was, moreover, very satisfactory as regards odor, taste, etc.

Example II

A volume of a very colored, distilled glycerol (color 250) was divided into two portions. Portion I was refractionated under diminished pressure. Portion II was extracted at 130° C. with 1.2 volumes of xylene in six equal portions and finally refractionated under diminished pressure. The colors of fractions of the distillates are given in Table I:

*Table I*

| Portion I | | | Portion II | | |
|---|---|---|---|---|---|
| Fraction | Percent of original glycerol | Color | Fraction | Percent of original glycerol | Color |
| 1 | 12.6 | 500 | 1 | 12.5 | 20 |
| 2 | 12.7 | 150 | 2 | 12.1 | 10 |
| 3 | 12.6 | 100 | 3 | 12.1 | 10 |
| 4 | 12.6 | 50 | 4 | 12.1 | 7 |
| 5 | 12.5 | 40 | 5 | 12.1 | 7 |
| 6 | 12.5 | 35 | 6 | 12.1 | 7 |
| 7 | 12.5 | 35 | 7 | 12.4 | 7 |
| 8 | 9.3 | 50 | 8 | 4.0 | 7 |
| | | | 9 | 6.1 | 25 |

Example III

A volume of distilled glycerol having a color of 50 was extracted at 85° C. with 0.8 volume of xylene in four portions and finally fractionally distilled under diminished pressure. The colors of the various fractions are given in Table II.

Example IV

A volume of a very colored distilled glycerol was extracted at 95° C. with 1.4 volumes of iso-octane and finally fractionally distilled under diminished pressure. The colors and quantities of the various fractions are given in Table II.

Example V

A volume of alpha-methyl-glycerol was extracted at 95° C. with 1.4 volumes of xylene and fractionally distilled under diminished pressure. The colors and quantities of the various fractions are given in Table II.

Table II

| Fraction | Example III Percent | Example III Color | Example IV Percent | Example IV Color | Example V Percent | Example V Color |
|---|---|---|---|---|---|---|
| 1 | 7.3 | 15 | 12.1 | ----- | 5.7 | 35 |
| 2 | 3.6 | 5 | 6.7 | 12 | 5.8 | 25 |
| 3 | 3.8 | 2 | 12.9 | 10 | 5.8 | 20 |
| 4 | 62.5 | 0 | 12.6 | 5 | 5.7 | 15 |
| 5 | 7.0 | 2 | 12.6 | 5 | 5.8 | 12 |
| 6 | 7.1 | 2 | 12.7 | 5 | 57.8 | 5-10 |
| 7 | 6.6 | 10 | 12.7 | 7 | 5.8 | 25 |
| 8 | | | 5.4 | 10 | 6.6 | Over 50 |
| 9 | | | 6.9 | 12 | | |
| 10 | | | 3.2 | | | |

While in the foregoing examples I have used a quantity of extractant equal to from 0.8 to 1.4 times the volume of the polyhydric alcohol, it is to be understood that the invention is not limited to these quantities. The amount of extractant preferably used depends upon the amount of the color-forming bodies present, the intimacy, method, and time of contact, etc., according to the well known laws of extraction, and may vary between wide limits.

The solvent, after use, may be easily and completely recovered for reuse. Upon subjecting the extract to a simple distillation, the solvent is completely recovered as the distillate while the color-forming bodies, accompanied by a small amount of polyhydric alcohol, remain as the residue. With the exception of the small amount of polyhydric alcohol unavoidably polymerized during the fractionation, the polyhydric alcohol in the residue from the distillation of the extract represents the only losses incurred by the treatment. (The quantity of color-forming bodies removed is too small to measure.)

While I have found the present method particularly suitable for the removal of certain color-forming bodies from glycerol, and particularly from glycerol synthesized from petroleum hydrocarbons, and have stressed this preferred application in the foregoing, it is to be understood that the invention is applicable to the treatment of other polyhydric alcohols, such as glycerol from other sources, ethylene glycol, erythritol, arabitol, mannitol, sorbitol, etc., when contaminated with color-forming bodies of the above-mentioned character.

As various modifications of my invention are possible without departing from the spirit thereof, it is to be understood that the invention is not limited to the specific embodiments thereof except as defined in the appended claims.

I claim as my invention:

1. A process for the removal of coloring matter from glycerol which comprises the steps of extracting substantially anhydrous distilled glycerine with an iso-octane at a temperature of from 80° C. to 150° C., separating the extract and raffinate phases, and fractionally distilling the raffinate phase whereby a decolorized glycerol is obtained.

2. A process for the removal of coloring matter from glycerol which comprises the steps of extracting substantially anhydrous distilled glycerol with xylol at a temperature of from 80° C. to 150° C., separating the extract and raffinate phases, and fractionally distilling the raffinate phase whereby a decolorized glycerol is obtained.

3. A process for the removal of coloring matter from glycerol which comprises the steps of extracting substantially anhydrous distilled glycerol at a temperature of from 80° C. to 150° C. with a hydrocarbon which is immiscible with glycerol, separating the extract and raffinate phases, and fractionally distilling the raffinate phase, whereby a decolorized glycerol is obtained.

4. A process for the removal of coloring matter from glycerol which comprises the steps of extracting distilled glycerol at a temperature of from 80° C. to 150° C. with a hydrocarbon which is immiscible with glycerol, separating the extract and raffinate phases, and fractionally distilling the raffinate phase, whereby a decolorized glycerol is obtained.

5. A process for the removal of coloring matter from glycerol which comprises the steps of extracting distilled glycerol at a temperature of from 80° C. to 150° C. with a lipophilic solvent which is immiscible with glycerol, separating the extract and raffinate phases, and fractionally distilling the raffinate phase, whereby a decolorized glycerol is obtained.

6. A process for the removal of coloring matter from glycerol which comprises the steps of subjecting the glycerol to a heat treatment equivalent to a distillation under diminished pressure, extracting the glycerol at a temperature above 50° C., but below that at which excessive decomposition takes place, with a lipophilic solvent which is immiscible with glycerol, separating the extract and raffinate phases, and fractionally distilling the raffinate phase, whereby a decolorized glycerol is obtained.

7. A process for the removal of coloring matter from glycerol which comprises the steps of subjecting the glycerol to a heat treatment equivalent to a distillation under diminished pressure, extracting the glycerol at a temperature above 50° C., but below that at which excessive decomposition takes place, with a lipophilic solvent which is immiscible with glycerol, separating the extract and raffinate phases, and removing any trace of solvent from the decolorized glycerol.

8. A process for the removal of coloring matter from polyhydric alcohols which comprises the steps of subjecting the polyhydric alcohol to a heat treatment equivalent to a distillation under diminished pressure, extracting the polyhydric alcohol at a temperature above 50° C., but below that at which excessive decomposition takes place, with a lipophilic solvent which is immiscible with glycerol, separating the extract and raffinate phases, and removing any trace of solvent from the decolorized polyhydric alcohol.

THEODORE EVANS.